No. 775,283. Patented November 15, 1904.

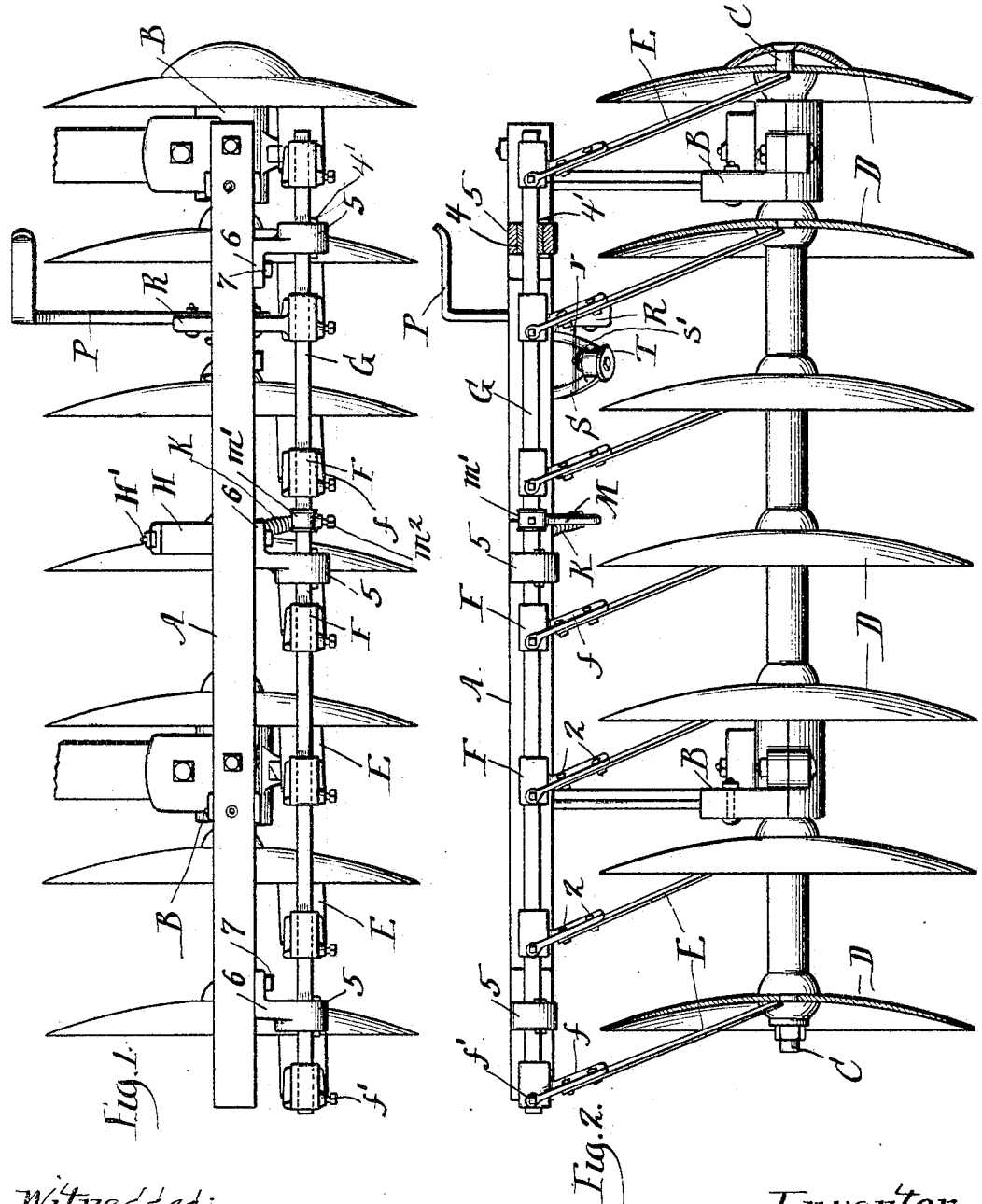

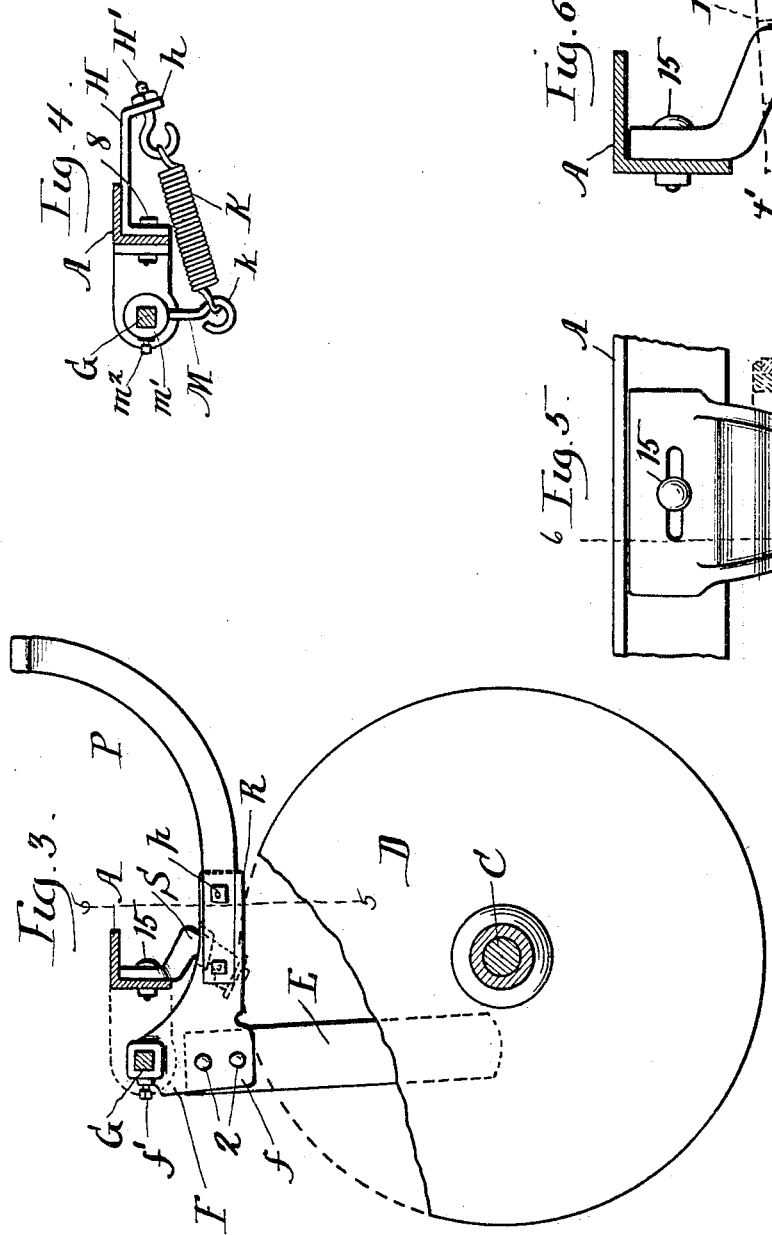

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

DISK HARROW.

SPECIFICATION forming part of Letters Patent No. 775,283, dated November 15, 1904.

Application filed March 7, 1904. Serial No. 196,880. (No model.)

*To all whom it may concern:*

Be it known that I, WILLIAM SOBEY, a citizen of the United States, residing at Racine, county of Racine, and State of Wisconsin, have invented certain new and useful Improvements in Disk Harrows, of which I do declare the following to be a full, clear, and exact description, reference being had to the accompanying drawings, forming part of this specification.

The invention relates particularly to that class of disk harrows in which the disks are arranged in gangs and are provided with individual scrapers by which the earth accumulating upon the disks is removed.

The invention consists in the features of improvement hereinafter described, illustrated in the accompanying drawings, and particularly pointed out in the claims at the end of this specification.

Figure 1 is a plan view showing part of a disk harrow embodying my invention. Fig. 2 is a rear elevation, parts being shown in section. Fig. 3 is a view in vertical cross-section on line 3 3 of Fig. 2, parts being shown in elevation. Fig. 4 is a view in cross-section on line 2 2 of Fig. 2 through the main frame and blade-supporting bar adjacent the spring-holding arm or bracket, parts being shown in elevation. Fig. 5 is an enlarged detail section on line 5 5 of Fig. 3. Fig. 6 is a detail section on line 6 6 of Fig. 5.

The main frame A of the machine may be of any familiar or suitable construction. As shown, the top plate of this frame is formed of angle-iron that is connected by brackets B with the axle C, whereon the several disks D are mounted. The disks D are of concavo-convex form, and opposite the concave face of each disk is mounted a scraper E, the purpose of which is to remove from its corresponding disk earth accumulating thereon. The several scrapers E are secured to a common rock-bar G, that is susceptible of being oscillated, so as to cause the free ends of the scrapers to swing between the peripheries and the centers of the disks. As shown, each of the scrapers consists of a spring-metal blade, the upper end of which is bolted or riveted, as at 2, to the inclined depending portion *f* of the blade-holder F. Preferably the blade-holders F are of cast metal, and each is formed with a square socket through which passes the bar G, that constitutes the blade-support, the blade-holders being fixed in position upon the bar G by set-screws *f''*, that pass through threaded holes in the blade-holders and bear against the side of the bar G. The bar G has mounted thereon several journal-sleeves 4, that fit within the bearings 5 of the bracket 6, these brackets being bolted, as at 7, to the rear face of the top bar of the main frame. Lugs 4' on each of the journal-sleeves 4 hold the same within the bearings 5 against longitudinal movement, and through the square hole in each of these journal-sleeves the bar G is free to slide. Projecting forwardly from the top bar of the main frame and conveniently bolted thereto, as at 8, is a bracket H, through the downwardly-turned end *h* of which passes a bolt H'. With the hook-shaped inner end of this bolt H' is engaged the forward end of a coiled spring K, the opposite end of this spring engaging the hooked lower end *k* of an arm M, the hub *m'* of which arm has a squared hole through which the bar G passes. The arm M is held in position upon the bar G by means of a set-screw *m²*, that passes through the hub of the arm and bears against the side of the bar G.

A treadle P, suitably connected to rock-bar G, serves as an actuator to turn the bar in its bearings 5, and thus compels the free ends of the scrapers to traverse the concave faces of the disks from near the center outward and then back again. As shown, the treadle P is bolted, as at *p*, to an arm R, that is cast in piece with one of the blade-holders F, although obviously the treadle P might be separately attached to the bar G. From the description of parts as thus far defined it will be seen that when the treadle P is depressed by the foot of the operator in manner well understood by those familiar with this class of devices the free ends of the scrapers E will be swung outward toward the peripheries of the disks because of the turn given the rock-bar G on depression of the treadle P. This turn of the rock-bar will occur against the force of coil-spring K, which being distended will cause the reverse shift of bar G when the treadle is released, and hence will return the free ends of the scrapers toward the centers of the disks D.

It will be observed that the inclined scraper-blades E are chisel-like—that is to say, they have working or cutting edges on their ends. In normal position the scraper-blades are held with their cutting edges against the concave faces of the disk adjacent the central portions thereof, and as the treadle P is operated the scraper-blades will be shifted to move their free or cutting ends from the centers to the peripheries thereof.

To hold the scraper-blades always at effective working relation with the concave faces of their disks, provision is made for a right-line shift of rock-bar G during the outward turn of the scraper-blades, the shift being at all times definitely limited, so that the blades are positively held at work against the disk-faces while still free to conform to the gradual "dish" of the disks. On release of the treadle at limit of the outturn the rock-bar, with its scraper-blades, describes the reverse turn to normal under definite control of the same means just alluded to, which keeps the blades at positive working contact with the disks despite the dish-like shape of the latter.

In the preferred form of the invention, which is that illustrated in the accompanying drawings, the keeper S is a casting that is connected by a bolt 15 to the top bar of the main frame, this bolt 15 passing through a long slot s in the keeper, so that its position may be adjusted as may be necessary to compensate for wear or to secure the most effective relative position of the parts controlled thereby. The keeper S is formed at one side with an inclined or cam-shaped face s', against which will bear the working face r of the arm R, that supports the treadle P. At its lower end the keeper S is formed with an offset portion s², having a hole therein through which passes a headed bolt t, that carries a stop T, this stop being preferably in the form of a disk or washer, through which the bolt passes. By means of the nut t' the stop can be set in different positions, so as to vary the throw of the treadle, and consequently limit the outward swing of the free ends of the scrapers E. When the treadle P is depressed by the operator, as hereinbefore described, so as to cause the free ends of the scrapers to move toward the peripheries of the disks D, the pressure of the scrapers against the concave faces of the disks will cause the scrapers, and as well also the scraper-support or bar G, to move longitudinally with respect to the disks' and during such movement the working face r of the arm R will bear against the inclined face s' of the keeper S. As the working face r of the arm R is moved down the inclined face of the keeper the keeper will serve to control the movement of the scraper-support, and thus insure the positive and effective engagement of the free ends of the several scrapers with the disks D.

I am aware that disk harrows have heretofore been constructed in which the scraper-support was free to move longitudinally under the restraint of a spring; but with such construction any excess movement of any one of the scrapers would correspondingly shift the scraper-support, thereby interfering with the effective relation of the remaining scrapers to their disks. When the pressure of the operator's foot is released from the treadle P and the scraper-support or bar G is rocked in opposite direction under the action of the coiled spring K, the working face r of the arm R will ride upward along the inclined face s' of the keeper S, and the keeper will thus positively force the scraper-support inward, and the scrapers will thus be held in effective bearing upon the concave faces of the disks.

So far as I am aware the invention presents the first instance of a disk harrow of the character described in which scrapers that are adapted to swing toward and away from the centers of the disks are carried by a support that is controlled by a keeper that insures a positive longitudinal movement of the scraper-support, and thus maintains the effective relation of the scrapers to the disks under all conditions.

Obviously it is not essential to the invention that the keeper should be located in the position shown, as a similar device adapted to positively control the longitudinal movement of the scraper-support might be located at other points.

Having described my invention, what I claim as new, and desire to secure by Letters Patent, is—

1. In a disk harrow, the combination with a series of concavo-convex disks, of a series of swinging scraper-blades therefor resting constantly against the disks, a supporting rock-bar for said blades, actuating means for said rock-bar and a stationary keeper coöperating with said rock-bar and arranged to positively hold said blades against the concave faces of the disks during the traverse while permitting the longitudinal shift of the rock-bar and scraper-blades in keeping with the curvature of the disks.

2. In a disk harrow, the combination with a series of concavo-convex disks, of the corresponding series of scraper-blades resting against the disks normally at their centers, the rock-shaft to sustain said blades and having a slight longitudinal shift, the stationary keeper arranged to positively control the extent of such shift during traverse by the blades against the disks, an actuator to turn the rock-shaft and a pull-spring, extended between the rock-shaft and the main frame, to restore the blades to normal, in reverse traverse along the disks.

3. In a disk harrow, the combination with a series of concavo-convex disks, of the corresponding series of scraper-blades resting against the disks normally at their centers, the rock-shaft to sustain said blades and having a slight longitudinal shift, the stationary keeper arranged to positively control the extent of such shift during traverse by the blades against the disks, the same being furnished with a suitable stop to limit the outward swing of the scraper-blades, an actuator to turn the rock-shaft and a pull-spring, extended between the rock-shaft and the main frame, to restore the blades to normal, in reverse traverse along the disks.

WILLIAM SOBEY.

Witnesses:
ALBERT J. DRUSE,
GEORGE H. BOLTON.